US011987156B2

(12) United States Patent
Lorey et al.

(10) Patent No.: US 11,987,156 B2
(45) Date of Patent: May 21, 2024

(54) VEHICLE SEAT HAVING A DEVICE FOR LEVEL REGULATION AND LEVEL STABILIZATION

(71) Applicant: GRAMMER AG, Ursensollen (DE)

(72) Inventors: Konstantin Lorey, Schmidgaden (DE); Konstantin Krivenkov, Amberg (DE); Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 572 days.

(21) Appl. No.: 17/172,632

(22) Filed: Feb. 10, 2021

(65) Prior Publication Data

US 2021/0253001 A1 Aug. 19, 2021

(30) Foreign Application Priority Data

Feb. 13, 2020 (DE) .......................... 102020103782.1

(51) Int. Cl.
*B60N 2/50* (2006.01)
*B60N 2/52* (2006.01)

(52) U.S. Cl.
CPC ............. *B60N 2/501* (2013.01); *B60N 2/505* (2013.01); *B60N 2/508* (2013.01); *B60N 2/525* (2013.01)

(58) Field of Classification Search
CPC ........ B60N 2/501; B60N 2/505; B60N 2/508; B60N 2/525; B60N 2/162; B60N 2/502; B60N 2/002; B60N 2/1665
USPC .................................. 267/131; 248/566, 588
See application file for complete search history.

(56) References Cited

U.S. PATENT DOCUMENTS

| 7,887,033 B2 * | 2/2011 | Shoemaker ............ B60N 2/508 267/136 |
| 9,377,074 B2 * | 6/2016 | Lorey ................... F16F 9/0218 |
| 2006/0278805 A1 * | 12/2006 | Haller ................... B60N 2/525 267/136 |

(Continued)

FOREIGN PATENT DOCUMENTS

| CN | 103661687 | 3/2014 |
| CN | 106080276 | 11/2016 |

(Continued)

OTHER PUBLICATIONS

Extended Search Report for European Patent Application No. 21155600.6, dated May 25, 2021, 10 pages.

(Continued)

*Primary Examiner* — Thomas J Williams
(74) *Attorney, Agent, or Firm* — Sheridan Ross P.C.

(57) ABSTRACT

A device for level regulation and level stabilization of a vehicle seat upper part. The device includes an air spring that spring loads a movement of the vehicle seat lower part and of the vehicle seat upper part relative to one another, the vehicle seat lower part and the vehicle seat upper part are arranged in a non-deflected state at a predeterminable distance from one another. The air spring is fluidically connected to a working volume of an additional volume module. A control unit decreases the volume of the working volume in the event of an increase in the distance and increases the volume of the working volume in the event of a decrease in the distance such that the pressure in the air spring can be changed such that the distance between the vehicle seat upper part and a reference surface is substantially unchanged.

12 Claims, 8 Drawing Sheets

(56) References Cited

U.S. PATENT DOCUMENTS

| | | | | |
|---|---|---|---|---|
| 2009/0134595 A1* | 5/2009 | Haller | ............... | B60G 17/0416 |
| | | | | 280/124.157 |
| 2018/0105082 A1* | 4/2018 | Knox | ...................... | B60N 2/38 |
| 2018/0111524 A1* | 4/2018 | Lorey | .................... | B60N 2/527 |
| 2021/0253001 A1* | 8/2021 | Lorey | .................... | B60N 2/508 |

FOREIGN PATENT DOCUMENTS

| | | | | |
|---|---|---|---|---|
| CN | 107972539 | 5/2018 | | |
| CN | 110497829 | 11/2019 | | |
| DE | 60026661 | 12/2006 | | |
| DE | 102010055344 | 6/2012 | | |
| DE | 102016120194 | 4/2018 | | |
| EP | 1518748 | 3/2005 | | |
| EP | 2062758 | 5/2009 | | |
| EP | 3312049 | 4/2018 | | |
| KR | 200197811 Y1 * | 9/2000 | ............ | B60N 2/502 |

OTHER PUBLICATIONS

Official Action with English Translation for China Patent Application No. 202110182814.1, dated Oct. 10, 2022, 12 pages.
Official Action for German Patent Application No. 102020103782.1, dated Nov. 12, 2020, 6 pages.
Official Action with Machine Translation for European Patent Application No. 21155600.6, dated Jun. 27, 2023, 6 pages.
Official Action with Partial Machine Translation for German Patent Application No. 102020103782.1, dated May 11, 2023, 5 pages.
Official Action with English Translation for China Patent Application No. 202110182814.1, dated Oct. 31, 2023, 8 pages.

* cited by examiner

VEHICLE SEAT HAVING A DEVICE FOR LEVEL REGULATION AND LEVEL STABILIZATION

CROSS-REFERENCE TO RELATED APPLICATION

This application claims the benefit of German Patent Application No. 102020103782.1 filed Feb. 13, 2020, the entire contents of which are incorporated herein by reference in their entirety.

FIELD

The invention relates to a vehicle seat having a vehicle seat upper part on which a mass can be arranged, a vehicle seat lower part and having a device for level regulation and level stabilization of the vehicle seat upper part, the device having an air spring by means of which a movement of the vehicle seat lower part and of the vehicle seat upper part relative to one another can be spring-loaded, the vehicle seat lower part and the vehicle seat upper part being arranged in a non-deflected state at a predeterminable distance from one another and the air spring being fluidically connected to a volume of a working volume of an additional volume module via a first fluid connection.

BACKGROUND

Vehicle seats of this type having a level regulation function are known in the prior art. In order to manipulate the internal pressure of the first air spring, a specific amount of fluid needs to be transferred from the additional volume or the first air spring, or the internal pressure of the entire system consisting of the additional volume and the first air spring needs to be changed.

A compressor is therefore provided, by means of which the internal pressure in the additional volume and the first air spring can be changed.

The compressor is activated frequently enough for the predetermined distance between the lower and the upper seat element to be kept as constant as possible under all operating conditions. However, it is disadvantageous for a vehicle driver when the compressor is active for a prolonged period of time, since it is very loud and makes for unbearable background noise. It can also make sounds easier to miss, and, amongst other things, the loud background noise can lead to ear problems, headaches or the like. The compressor must also be actuated relatively slowly, which means that the provision of fluid is insufficient for rapid and dynamic level regulation and stabilization.

SUMMARY

Therefore, the object of the present invention is to provide a vehicle seat comprising a device for level regulation and level stabilization that does not require a compressor during operation and is therefore correspondingly quiet to operate and also does not change the position of the vehicle seat upper part with respect to the ground surface and is correspondingly fast.

This object is achieved in accordance with the features of embodiments of a vehicle seat as described herein.

The core idea of the invention is to provide a vehicle seat having a vehicle seat upper part on which a mass can be arranged, a vehicle seat lower part and having a device for level regulation and level stabilization of the vehicle seat upper part, the device having an air spring by means of which a movement of the vehicle seat lower part and of the vehicle seat upper part relative to one another can be spring-loaded, the vehicle seat lower part and the vehicle seat upper part being arranged in a non-deflected state at a predeterminable distance from one another and the air spring being fluidically connected to a volume of a working volume of an additional volume module via a first fluid connection, the vehicle seat having a control unit, the control unit being provided and designed to decrease the volume of the working volume in the event of an increase in the distance due to the relative movement such that a pressure in the air spring can be changed such that the distance between the vehicle seat upper part and a reference surface is substantially unchanged, and to increase the volume of the working volume in the event of a decrease in the distance due to the relative movement such that the pressure in the air spring can be changed such that the distance between the vehicle seat upper part and a reference surface is substantially unchanged.

The fact that the pressure in the air spring, depending on the configuration of the air spring, remains substantially unchanged or can be dynamically adapted depending on the situation means that the position of the vehicle seat upper part does not change substantially relative to the ground surface or, in other words, is substantially constant.

The reference surface is to be understood as a surface that does not change in position during the deflection of the vehicle. The reference surface can be formed by means of the ground surface.

The air spring is preferably designed to be deformable. More preferably, the vehicle seat has a scissor frame which is arranged between the vehicle seat lower part and the vehicle seat upper part and connects the vehicle seat upper part to the vehicle seat lower part. Of course, other types of connection are also possible, for example a parallelogram arrangement or the like. The connection between the vehicle seat upper part and the vehicle seat upper part should bring the two parts together and allow a relative movement.

The vehicle seat lower part is preferably connected to a vehicle body or a vehicle cab or is already part of the body. This means that the vehicle seat lower part moves synchronously with the respective component, i.e. without a phase offset. This is provided in particular because the vehicle seat lower part should perform the same movement for complete compensation.

In this respect, the term "mass" can be understood to mean any body that can be arranged on the vehicle seat upper part. A mass is preferably a vehicle driver sitting on the vehicle seat, in particular on the vehicle seat upper part.

The term "additional volume module" is to be understood in this case as a device which comprises at least the working volume, in particular a delimited working volume. Furthermore, it is conceivable for the additional volume module to comprise a shut-off valve so that the air spring is fluidically disconnected from the additional volume. In addition, the additional volume module can comprise various sensors, for example for detecting leakages or the like.

Different driving situations can arise for the vehicle seat: the vehicle drives into a pothole or the like, the vehicle drives over an elevation or the vehicle is not deflected.

If the vehicle is not deflected, no force acts on the vehicle seat and the vehicle seat remains unchanged with regard to the distance.

The situation for the vehicle seat changes if the vehicle drives through a pothole, a depression or the like. Because the vehicle seat is preferably connected to the vehicle, the vehicle body or the vehicle cab, the vehicle seat lower part moves downwards in accordance with the movement of the connecting part, i.e. the vehicle seat lower part is moved relative to the vehicle seat upper part, so that the distance between them is increased.

If it is detected that the distance between the vehicle seat lower part and the vehicle seat upper part is increasing, according to the invention the volume of the working volume is changed such that the volume of the working volume is decreased so that the pressure in the air spring can be changed such that the distance between the vehicle seat upper part and a reference surface is substantially unchanged.

The situation for the vehicle seat changes if the vehicle drives over an elevation or the like. Because the vehicle seat is preferably connected to the vehicle, the vehicle body or the vehicle cab, the vehicle seat lower part moves upwards in accordance with the movement of the connecting part, i.e. the vehicle seat lower part is moved relative to the vehicle seat upper part, so that the distance between them is decreased.

If it is detected that the distance between the vehicle seat lower part and the vehicle seat upper part is decreasing, according to the invention the volume of the working volume is changed such that the volume of the working volume is increased so that the pressure in the air spring can be changed such that the distance between the vehicle seat upper part and a reference surface is substantially unchanged.

The change in the volume of the working volume is carried out by a control unit which, according to a particularly preferred embodiment, is arranged on or in the additional volume module.

According to a further preferred embodiment, the device has a detection unit which is designed and provided to detect the change in the distance, the control unit being connected for signalling to the detection unit and changing the volume of the working volume depending on the detected change in the distance and possibly depending on acceleration values on the vehicle seat lower part and the vehicle seat upper part.

According to a preferred embodiment, the detection unit has a first sensor, arranged on the vehicle seat upper part, a second sensor, arranged on the vehicle seat lower part, and a third sensor for determining a position of the vehicle seat upper part relative to the vehicle seat lower part.

As the third sensor, the detection unit preferably comprises a distance sensor which is designed and provided to detect and determine the distance between the vehicle seat upper part and the vehicle seat upper part. The position of the vehicle seat upper part relative to the vehicle seat lower part can preferably be determined. The distance sensor can preferably be an angle sensor which is arranged at the connection between the vehicle seat upper part and the vehicle seat lower part. Of course, further types of sensors are also conceivable.

The first and the second sensor are preferably sensors for recording accelerations, in particular of the vehicle seat upper part and the vehicle seat lower part. It can thus be determined how the vehicle seat upper part and the vehicle seat upper part move relative to one another.

Furthermore, the change in the volume of the working volume is carried out by means of the control unit so that the pressure in the air spring can be changed.

According to a further embodiment, at least one damping unit for damping vibrational movements of the upper seat element relative to the lower seat element is provided between the lower and the upper seat element.

According to a further preferred embodiment, it is provided that the device has a compressor unit which is designed and provided to fill the air spring and the working volume with a fluid so that a specific pressure prevails within the air spring, whereby the distance is predetermined.

If a person, i.e. a mass, sits down on the vehicle seat upper part, the person would naturally want to set the seat height to a height that is deemed convenient and comfortable by that particular person. In order to achieve the appropriate seat height, the air spring has to be filled with a specific amount of fluid so that the upper seat element is raised to the desired seat height. Preferably, the air spring is indirectly filled with an amount of fluid via the working volume or the additional volume module by means of the compressor, a pressure equilibrium in particular being established in the air spring and the working volume. Alternatively, it is also conceivable that the air spring and the working volume are filled independently of one another.

If the vehicle seat upper part is occupied by the mass, and the distance is set by means of the compressor, the compressor is deactivated and is generally no longer needed during operation. Re-activation of the compressor is then necessary only in the event of a leakage or the like, or if another seat height is to be set.

According to a further preferred embodiment, it is provided that the additional volume module further has a support volume which is connected to the working volume for force support during a change in volume of the working volume by means of the control unit.

In particular, the support volume is mechanically connected to the working volume. Mechanically connected means in this case that there is a connection between the components, which is designed so as to be mechanical. During the filling process, it is conceivable that the support volume and the working volume are also fluidically connected. If the compressor unit is not active, i.e. the seat height and the distance are set and the air spring and the working volume do not need to be filled, the support volume and the working volume are only mechanically connected, which means that there is no fluidic connection between the support volume and the working volume.

According to a preferred embodiment, it is provided that the support volume is fluidically connected to the working volume during the filling of the air spring with fluid by the compressor unit by means of an open valve and otherwise are fluidically disconnected from the working volume.

A fluidic connection line is preferably provided between the support volume and the working volume, which connection line has the valve and which can be opened or closed by means of the valve. The control unit can, for example, carry out the control of the valve, it also being conceivable that the valve can be operated manually.

According to a further preferred embodiment, it is provided that the control unit has a linear drive which is provided and designed to change the volume of the working volume.

The linear drive is particularly preferably at least one selected from the group comprising a spindle-nut combination, a toothed rack, a conversion gear, a direct drive, a link guide and a deformation apparatus.

A conversion gear can particularly preferably be a Watt conversion gear, a Chebyshev conversion gear, an Evans conversion gear or the like.

Furthermore, the direct drive is particularly preferably a lifting magnet.

The deformation apparatus is more preferably a device having a motor and a rocker-like deformation element which, depending on the direction of rotation, deforms the working volume and changes the volume of the working volume accordingly.

According to a further preferred embodiment, the working volume is designed as an air spring having a rolling bellows, as a bellows spring, as an air cylinder or as an air motor.

According to a further preferred embodiment, the support volume is designed as an air spring having a rolling bellows, as a bellows spring, as an air cylinder or as an air motor.

In addition, the underlying object is also achieved by a method for level regulation of a vehicle seat upper part of a vehicle seat (1), the vehicle seat having an upper vehicle seat upper part ( ) which can be displaced by an air spring relative to a vehicle seat lower part, the air spring being fluidically connected to a working volume ( ) of an additional volume module ( ) and the pressure in the air spring being changed by the working volume, comprising the method steps:

a) occupying the vehicle seat upper part with a mass;
b) setting a distance between the vehicle seat lower part and the vehicle seat upper part by filling the working volume and the air spring by a compressor unit with the required amount of fluid and deactivating the compressor unit after the filling process;
c) detecting a change in the distance due to a movement of the vehicle seat lower part and the vehicle seat upper part relative to one another;
d) changing the pressure in the air spring by changing a volume of the working volume, wherein in the event of an increase in the distance due to the relative movement, the volume of the working volume is decreased, and in the event of a decrease of the distance due to the relative movement, the volume of the working volume is increased, so that the pressure in the air spring is changed such that the distance between the vehicle seat upper part and a reference surface is substantially unchanged.

Occupying the vehicle seat upper part with the mass can mean, for example, a person sitting on the vehicle seat upper part of the vehicle seat. If the vehicle seat upper part is occupied by the mass, for example by the person, the person can set the desired seat height of the vehicle seat by means of an adjustment device, which results in a specific distance between the vehicle seat lower part and the vehicle seat upper part. The working volume and the air spring are accordingly filled by means of the compressor unit with the necessary amount of fluid until the internal pressure required in the first air spring has been reached. The compressor unit is deactivated after the filling process.

The additional volume module more preferably has a support volume which is connected to the working volume for force support during a change in volume of the working volume by means of the control unit.

The support volume is fluidically connected to the working volume during the filling of the air spring with fluid by the compressor unit by means of an open valve and is otherwise fluidically disconnected from the working volume. After the working volume and the support volume have been filled, the support volume is fluidically disconnected from the working volume.

If it is then detected that there is a change in the distance due to a deflection of the vehicle seat lower part and possibly the vehicle seat upper part, then it is necessary, then it is provided to change the volume of the working volume in order to change the pressure in the air spring such that the distance between the vehicle seat upper part and a reference surface can be left substantially unchanged. In order not to have to use the compressor unit, the volume of the working volume is changed by means of the control unit in accordance with the change in the distance.

On the whole, it should be pointed out here that the change in distance is a rapid change in comparison with a vibrational movement caused by external force impacts. The distance is therefore changed over a short period of time. In addition, the extent of the change in distance is to be equated with an extent of a force impact from the outside.

Furthermore, a rapid actuation of the device is conceivable in order to counteract the occurring force impacts. This is a rapid level stabilization relative to the reference surface and as a result of the vibration isolation.

Alternatively, a manual change of the distance by means of the device and not by the operation of a compressor is also possible. This is a manual level regulation.

The features on the device side can also be used in a corresponding manner as features on the method side.

Further advantageous embodiments result from the dependent claims.

BRIEF DESCRIPTION OF THE DRAWINGS

Additional objects, advantages and expedient uses of the present invention can be found in the following description in conjunction with the drawings, in which.

DETAILED DESCRIPTION

Figure 1:
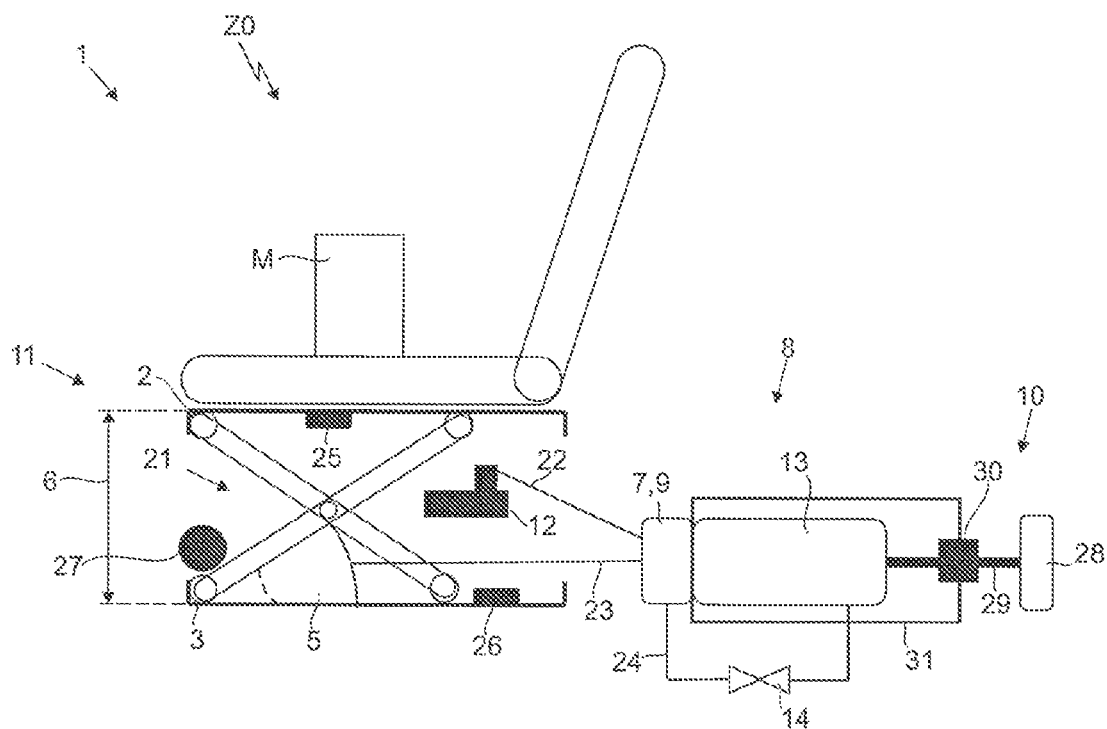
FIG. 1 schematically shows a first embodiment of the vehicle seat, shown in the non-deflected state.

In the drawings, identical components are to be provided with corresponding reference signs in each case. For the sake of clarity, in some of the drawings, components that have been identified elsewhere may not be provided with a reference sign.

FIG. 1 shows a vehicle seat 1 according to a preferred embodiment in a non-deflected state Z0.

In this case, a mass M, which may be a person for example, is arranged on the vehicle seat upper part 2. A distance 6 is set between the vehicle seat upper part 2 and the vehicle seat lower part 3, which distance is associated with a specific pressure in the air spring 5, which is arranged between the vehicle seat upper part 2 and the vehicle seat lower part 3. The vehicle seat lower part 3 and the vehicle seat upper part 2 are in the present case connected to one another by means of a scissor frame 21.

In this case, the distance 6 is set using a compressor unit 12, which is fluidically connected to the additional volume module 8 and in particular to the working volume 7 by means of a first fluid connection 22. By means of the compressor unit 12, the working volume 7 and, indirectly via a second fluid connection 23, the air spring 5 are filled with an amount of fluid in order to produce a specific pressure in the air spring 5.

Furthermore, a support volume 13 is also provided, which is mechanically connected to the working volume 7. During the filling process, the support volume 13 can be fluidically connected to the working volume 7, the support volume 13 and the working volume 7 being fluidically disconnected from one another in normal operation. A third fluid connection 24 having a valve 14 is provided between the support volume 13 and the work, the valve 14 being switched to be open during the process of filling with fluid and being otherwise closed.

When the vehicle seat 1 is in operation with the device 4, i.e. after setting the distance 6 with a mass M, the compressor unit 12 is deactivated. If a change in the distance 6 is detected by means of a detection unit 11, the volume of the working volume 7 is changed by means of a control unit 10 in order to change the pressure in the air spring 5.

It is preferably also conceivable for the detection unit 11 and the control unit 10 to be component parts of the additional volume module 8.

Furthermore, the additional volume module 8 has a control unit 10, comprising a motor 28, which is connected to a spindle-nut combination 19 comprising a spindle 29, the spindle 29 being connected to a nut 30, and the nut 30 being connected to a connection 31 which is also mechanically connected to the working volume 7 and the support volume 13.

A rotational movement of the spindle 29 moves the nut 30 along the spindle 29 so that the connection 31 also moves and the working volume is correspondingly deformed, so that the volume 9 of the working volume 7 is changed.

Sensors for determining the deflections and the positions and the distance 6 are preferably provided, namely a first sensor 25, a second sensor 26 and a third sensor 27. The first sensor 25 is arranged on the vehicle seat upper part 2, the second sensor 26 is arranged on the vehicle seat lower part 3 and the third sensor is arranged on the connection between the vehicle seat lower part 3 and the vehicle seat upper part 2, in this case preferably the scissor frame 21. The first sensor 25 and the second sensor 26 are designed as acceleration sensors, the third sensor 27 being designed to determine a position of the vehicle seat upper part 2 relative to the vehicle seat lower part 3, i.e. the distance 6.

Figure 2:
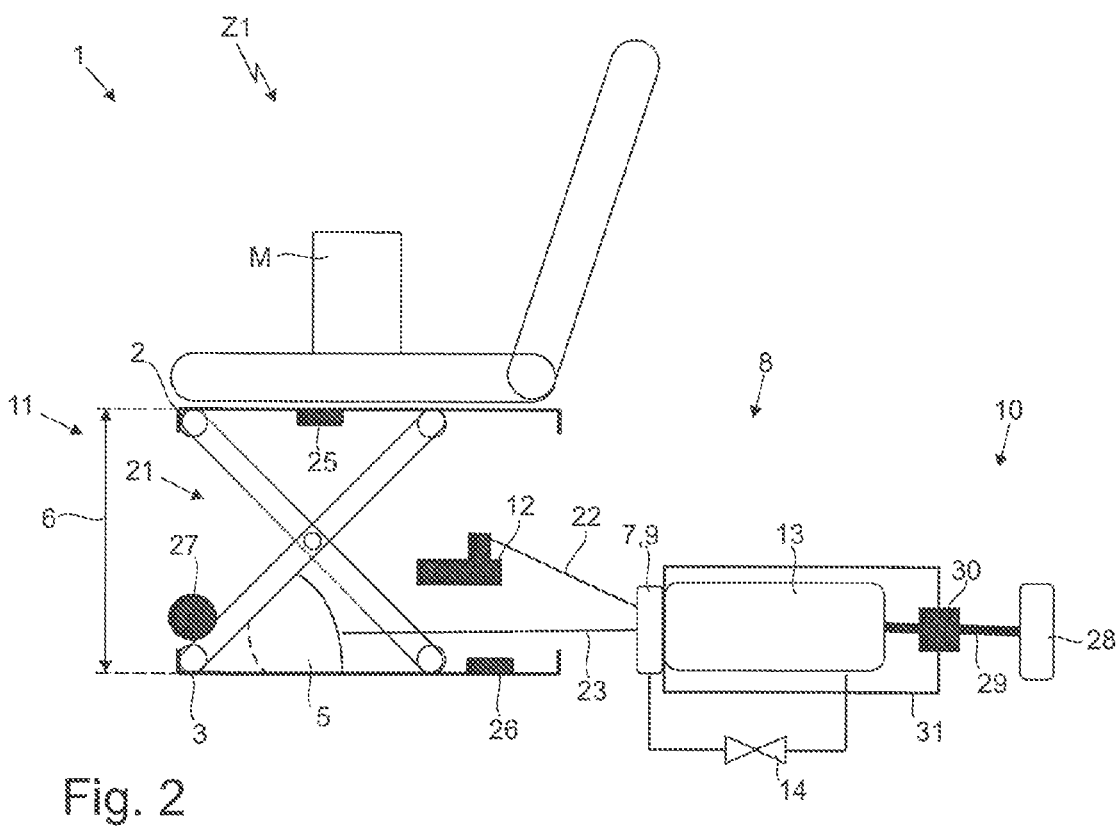
FIG. 2 shows the subject of FIG. 1 in a downwardly deflected state.

In FIG. 2, the vehicle seat 1 of FIG. 1 is shown in a downwardly deflected state Z1, i.e. the distance 6 between the vehicle seat upper part 2 and the vehicle seat lower part 3 increases. This is the case, for example, when the vehicle drives into a pothole, i.e. is deflected downwards, as a result of which the vehicle seat lower part 3 is also deflected downwards.

By means of the movement of the vehicle seat lower part 3 downwards, the air spring 5 is expanded and the supporting force is therefore decreased. To compensate for this, the volume 9 of the working volume 7 is decreased and the pressure is increased accordingly, so that the pressure in the air spring 5 can be changed via the second fluid line 23.

Figure 3:
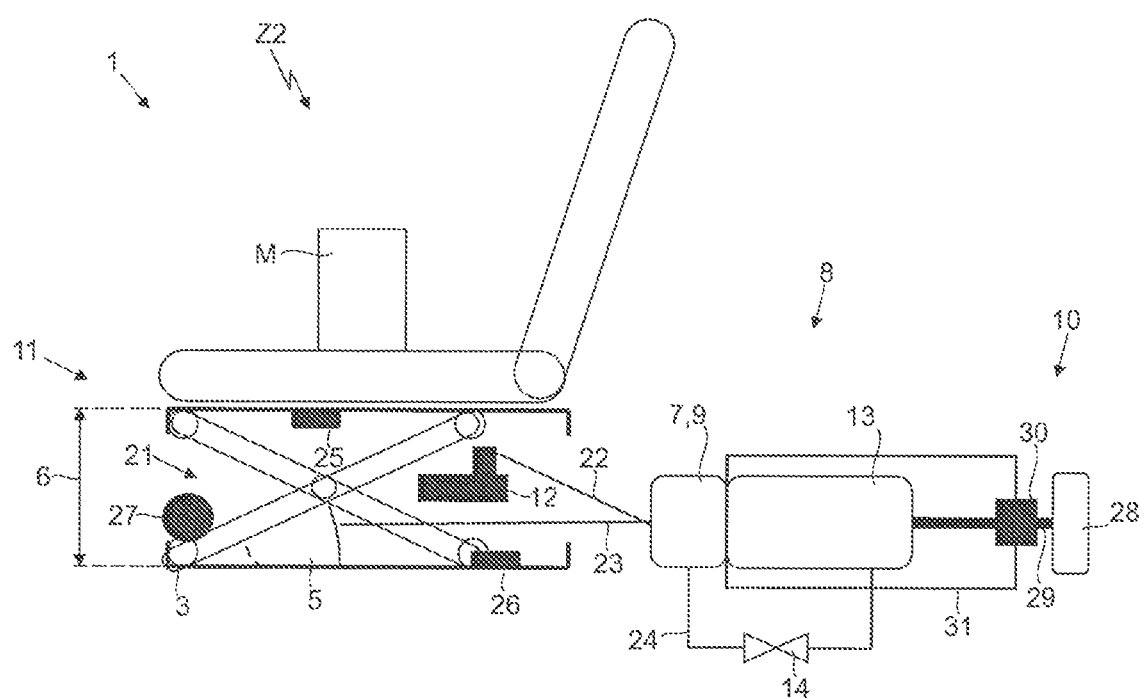
FIG. 3 shows the subject of FIG. 1 in an upwardly deflected state.

In FIG. 3, the vehicle seat of FIG. 1 is shown in an upwardly deflected state Z2, i.e. the distance 6 between the vehicle seat upper part 2 and the vehicle seat lower part 3 is decreased. This is the case, for example, when the vehicle drives over an elevation, i.e. is deflected upwards, whereby the vehicle seat lower part 3 is also deflected upwards.

By means of the movement of the vehicle seat lower part 3 upwards, the air spring 5 is compressed and the supporting force is therefore increased. To compensate for this, the volume 9 of the working volume 7 is increased and the pressure is decreased accordingly, so that the pressure in the air spring 5 is changed via the second fluid line 23, such that the distance between the vehicle seat upper part and a reference surface is substantially unchanged.

Because the pressure in the air spring 5 is changed accordingly, the position of the vehicle seat upper part 2 does not change relative to the reference surface, preferably the ground surface.

The additional volume module 8 is shown in more detail in the following drawings. Various embodiments of the additional volume module 8 are also shown.

Figure 4:
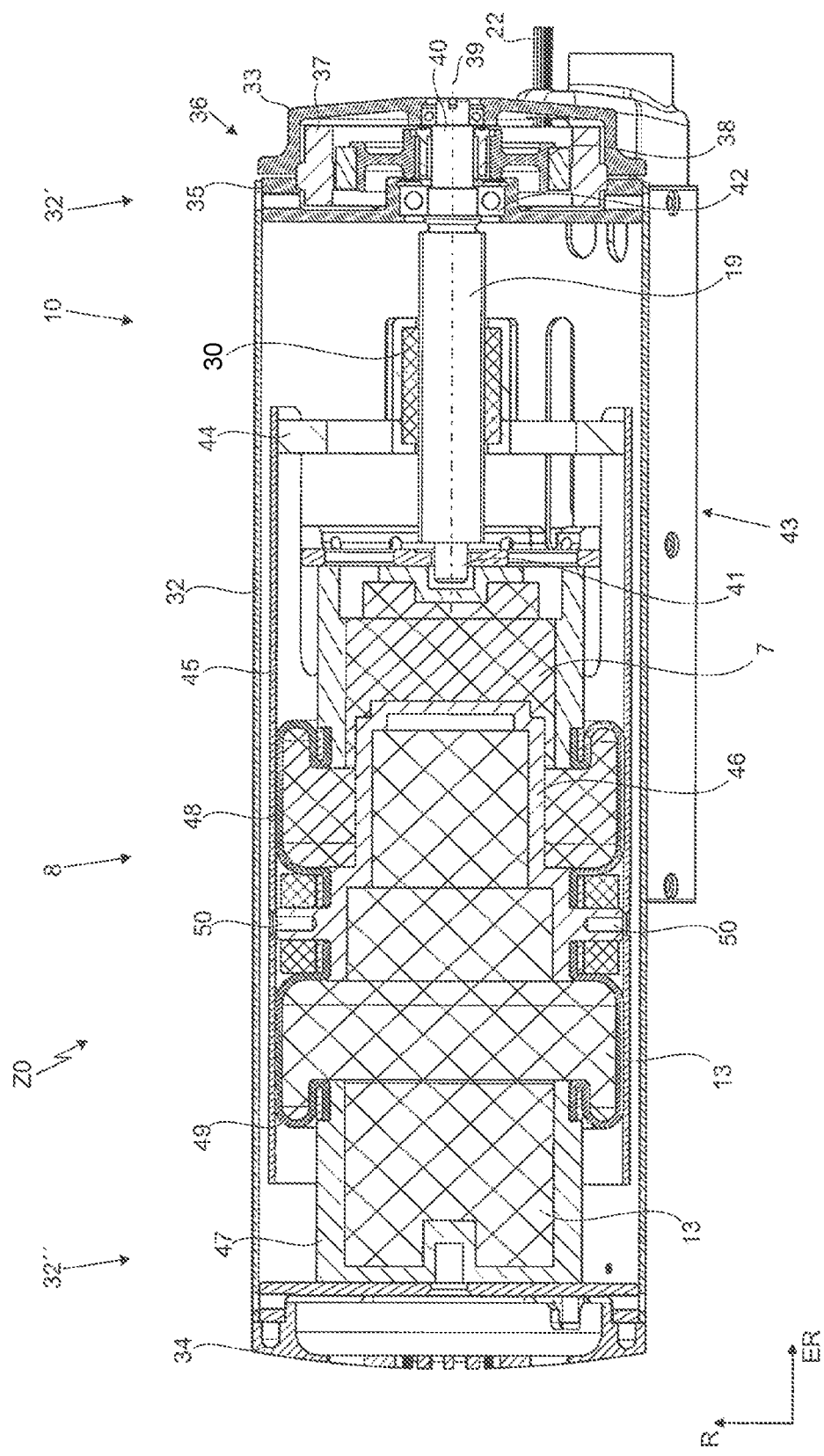
FIG. 4 shows the additional volume module according to a first embodiment in the non-deflected state.
Figure 5:
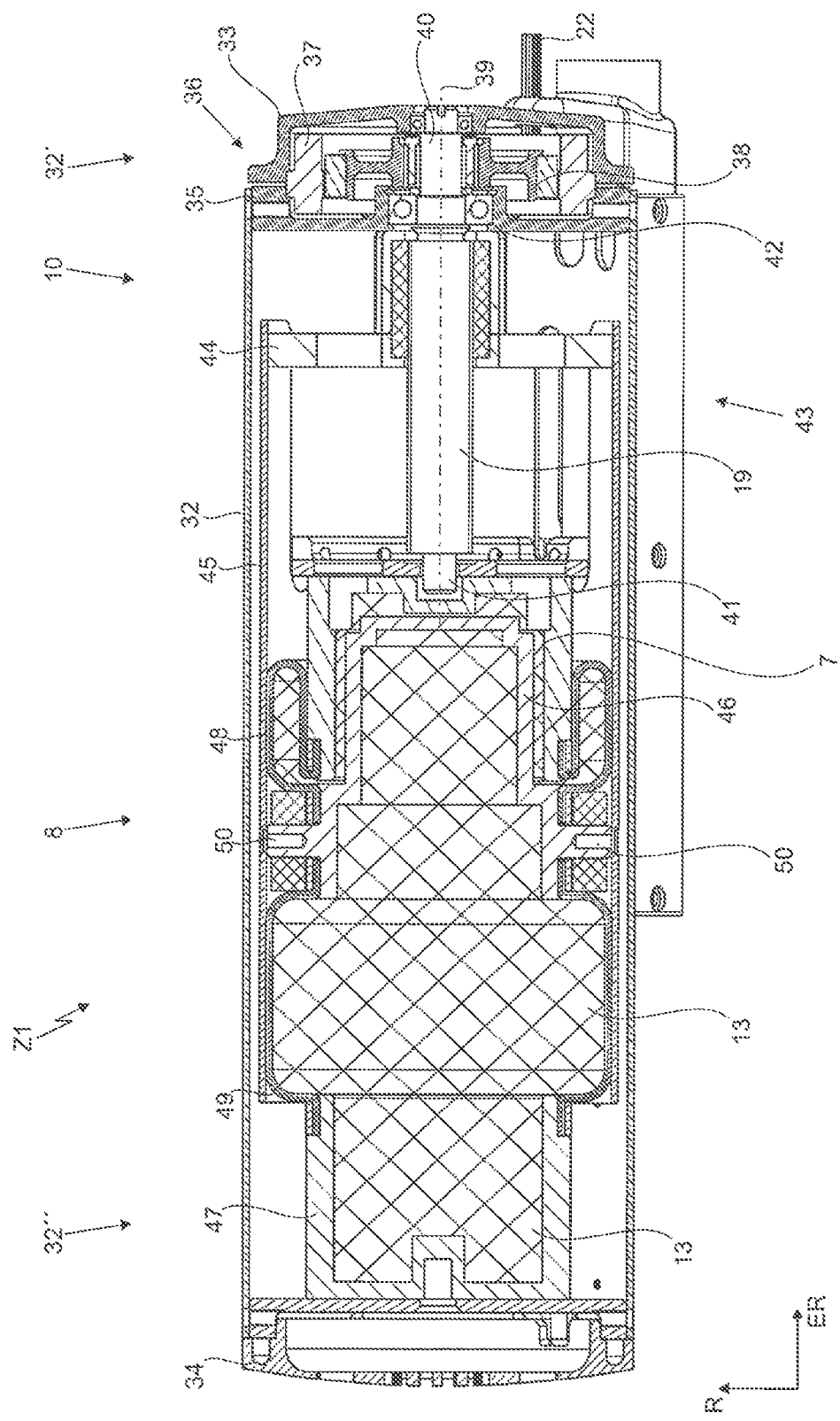
FIG. 5 shows the additional volume module according to FIG. 4 in the downwardly deflected state.
Figure 6:
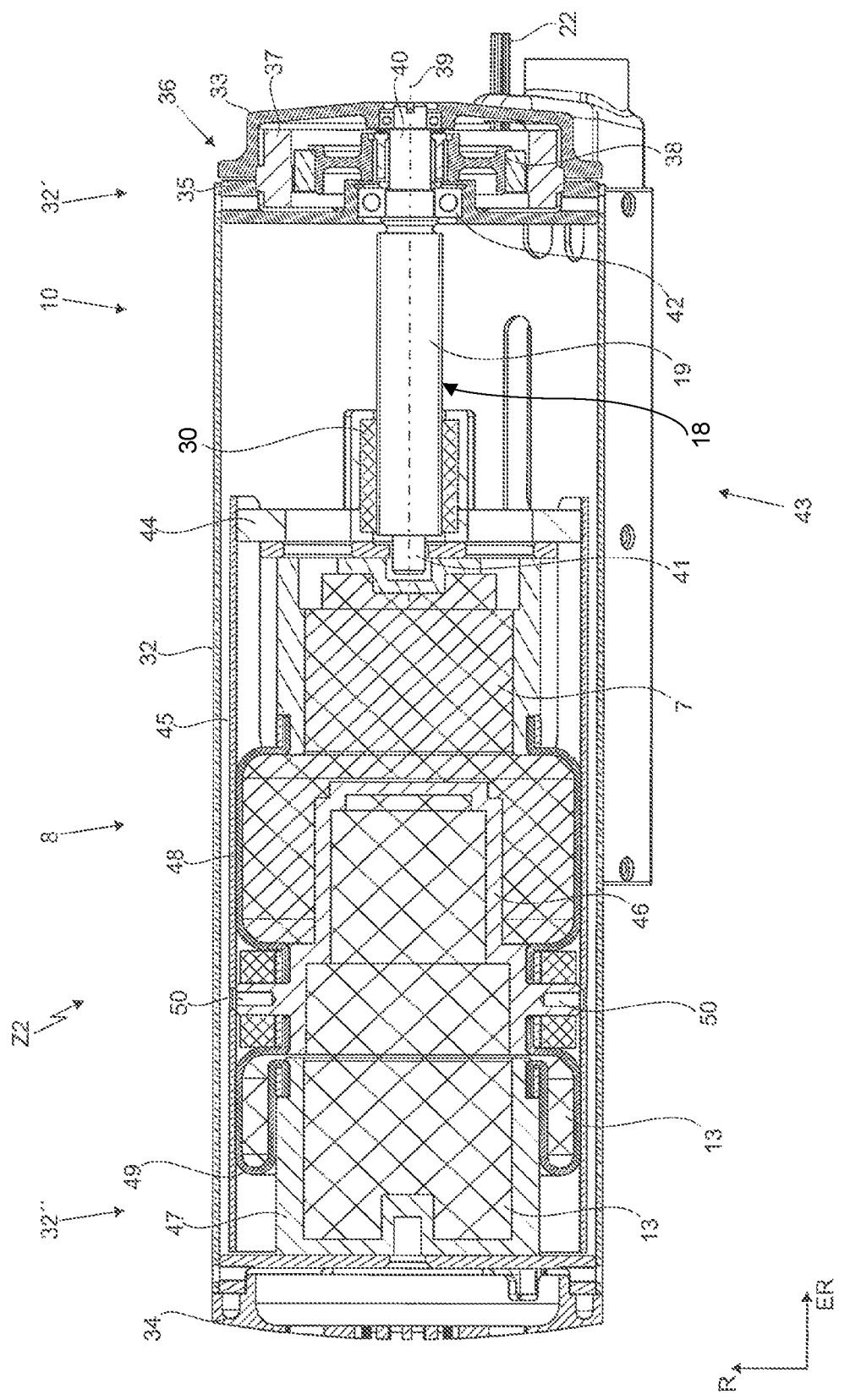
FIG. 6 shows the additional volume module according to FIG. 4 in the upwardly deflected state.

A first embodiment of the additional volume module 8 is shown in FIGS. 4 to 6.

The additional volume module 8 has a housing 32 having a first end 32' and a second end 32". The housing 32 is preferably of cylindrical design and extends in a longitudinal extension direction ER. A first cover 33 is arranged at the first end 32' and a second cover 34 is arranged at the second end 32", which covers close the additional volume module 8. From the first cover 33 into the interior of the additional volume module 8, a first holding element 35 is provided, the first holding element 35 and the first cover being provided to locally fixate a drive 36, the drive 36 in the present case being designed as an electric motor having a stator 37 and a rotor 38, the stator 37 surrounding the rotor 38. The rotor 38 is connected to a spindle 29 so that the rotor 38 and the spindle 29 can rotate about a common axis of rotation 39. The spindle 29 preferably has a first end 40 and a second end 41, the first end 40 being rigidly connected to the rotor 38. The spindle 29 is arranged in a stationary manner opposite the first holding element 35, the spindle 29 being mounted by means of a ball bearing 42 opposite the first holding element 35 in order to be able to ensure easy rotatability of the spindle 29.

The second end 41 of the spindle 29 is connected to a second holding element 43, the second holding element 43 being arranged in a stationary manner opposite the housing 32.

Furthermore, a nut 30 is provided, which is in operative contact with the spindle 29, whereby the nut 30 can be moved along the spindle 29 by rotating the spindle 29 about the axis of rotation 39, depending on the direction of rotation of the spindle 29 towards the first end 40 or towards the second end 41.

The nut 30 is preferably rigidly connected to a piston-like element 44, which therefore also moves during a movement of the nut 30 along the spindle 29. The piston-like element 44 also has an enclosure 45 which is substantially cylindrical in shape and on which a separating element 46 is further arranged in a stationary manner. The function of the separating element 46 is explained in more detail below.

Furthermore, a third holding element 47 is provided, which is rigidly connected to the second cover 34.

The working volume 7 and the support volume 13 are designed as follows.

The working volume 7 is limited by the second holding element 43, the separating element 46 and further by a first bellows element 48, which is rigidly connected on the one hand to the separating element 46 and is rigidly connected on the other hand to the second holding element 43. The volume enclosed by the second holding element 43, the separating element 46 and the first bellows element 48 defines the working volume 7.

The support volume 13, on the other hand, is limited by the third holding element 47, the separating element 46 and a second bellows element 49, which is rigidly connected on the one hand to the separating element 46 and is rigidly connected on the other hand to the third holding element 47. The volume which is enclosed by the third holding element 47, the separating element 46 and the second bellows element 49 defines the support volume 13.

The bellows elements 48, 49 are preferably designed as a rolling bellows.

Furthermore, the bellows elements 48, 49 are delimited in the radial direction R by the enclosure, i.e. the working volume 7 and the support volume 13 are at least partially arranged within the enclosure 45, depending on the design of the enclosure 45.

The bellows elements 48, 49 are particularly preferably designed such that they roll on the enclosure 45.

The separating element 46 is screwed to the enclosure 45 by means of screws 50, a rivet connection or the like also being conceivable.

In FIG. 4, the additional volume module 8 is shown in the state Z0, i.e. in the non-deflected state of the vehicle seat 1.

In FIG. 5, the additional volume module 8 of the drawing is shown in the state Z1, i.e. in the downwardly deflected state of the vehicle seat 1. As can be seen, the volume 9 of the working volume 7 has been decreased, whereby the amount of air or pressure in the air spring 3 can be changed due to the expansion of the air spring 3. For this purpose, the spindle 29 was rotated about the axis of rotation 39 by means of the electric motor such that the nut 30 was moved in the extension direction ER in the direction of the first end 40 of the spindle 29.

The first holding element 35 also serves as an end stop for the movement of the nut 30, in the direction of the first end 40 of the spindle 29.

In FIG. 6, the additional volume module 8 of the drawing is shown in state Z2, i.e. in the upwardly deflected state of the vehicle seat 1. As can be seen, the volume 9 of the working volume 7 has been increased, whereby the pressure in the air spring 3 can be changed due to the compression of the air spring 3. For this purpose, the spindle 29 was rotated about the axis of rotation 39 by means of the electric motor such that the nut 30 was moved in the extension direction ER towards the second end 41 of the spindle 29.

According to the structure of the additional volume module 8, the second holding element 43 also serves as an end stop for the movement of the nut 30 in the direction of the second end 41 of the spindle 29.

Figure 7A:
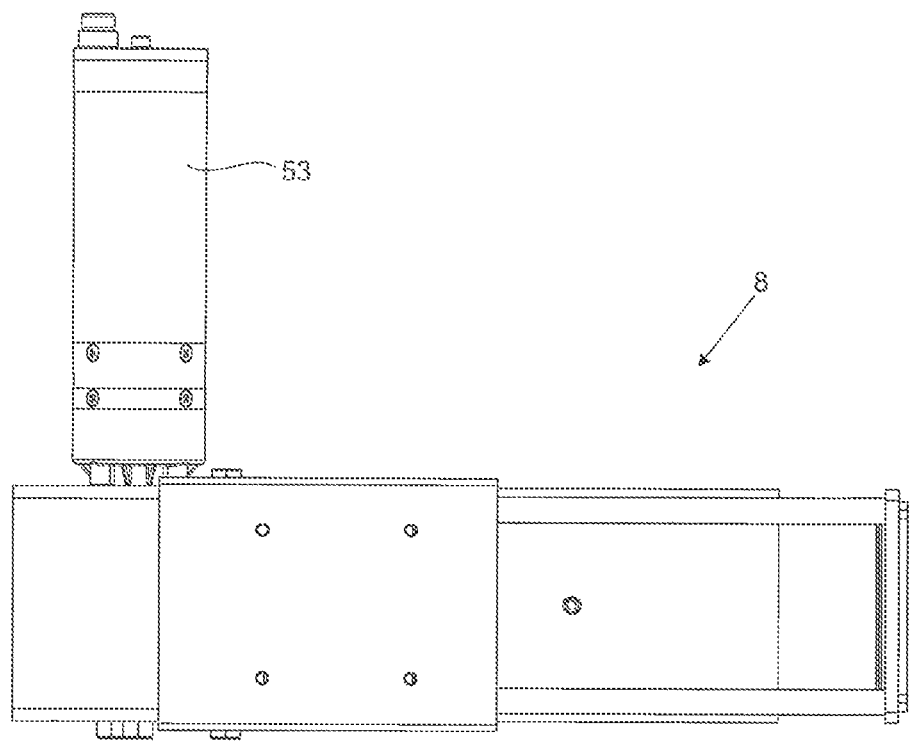
FIG. 7A is a top view of the additional volume module according to a second embodiment.
Figure 7B:
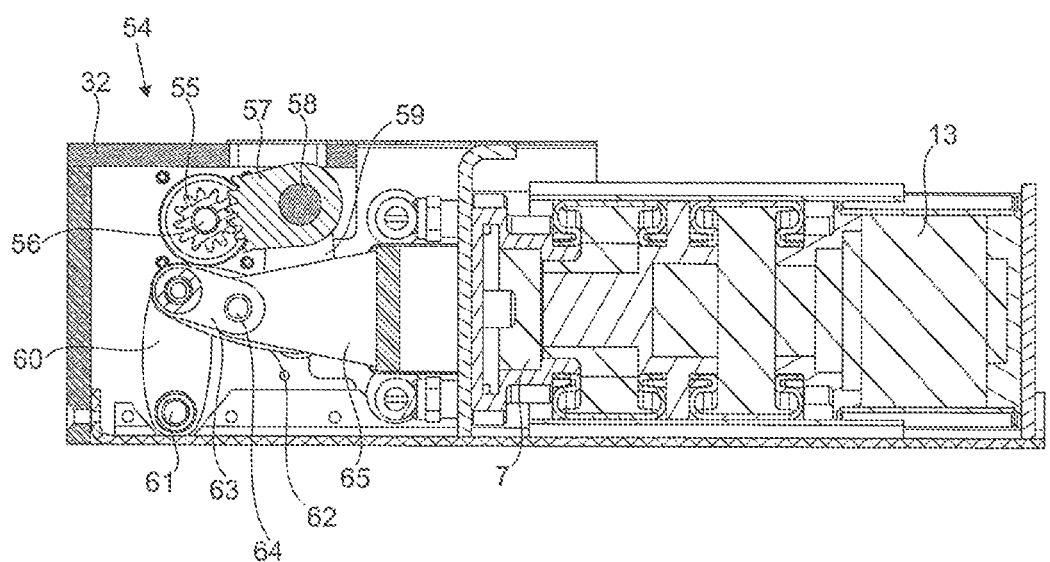
FIG. 7B is a sectional view of the additional volume module according to FIG. 7A.
Figure 7C:
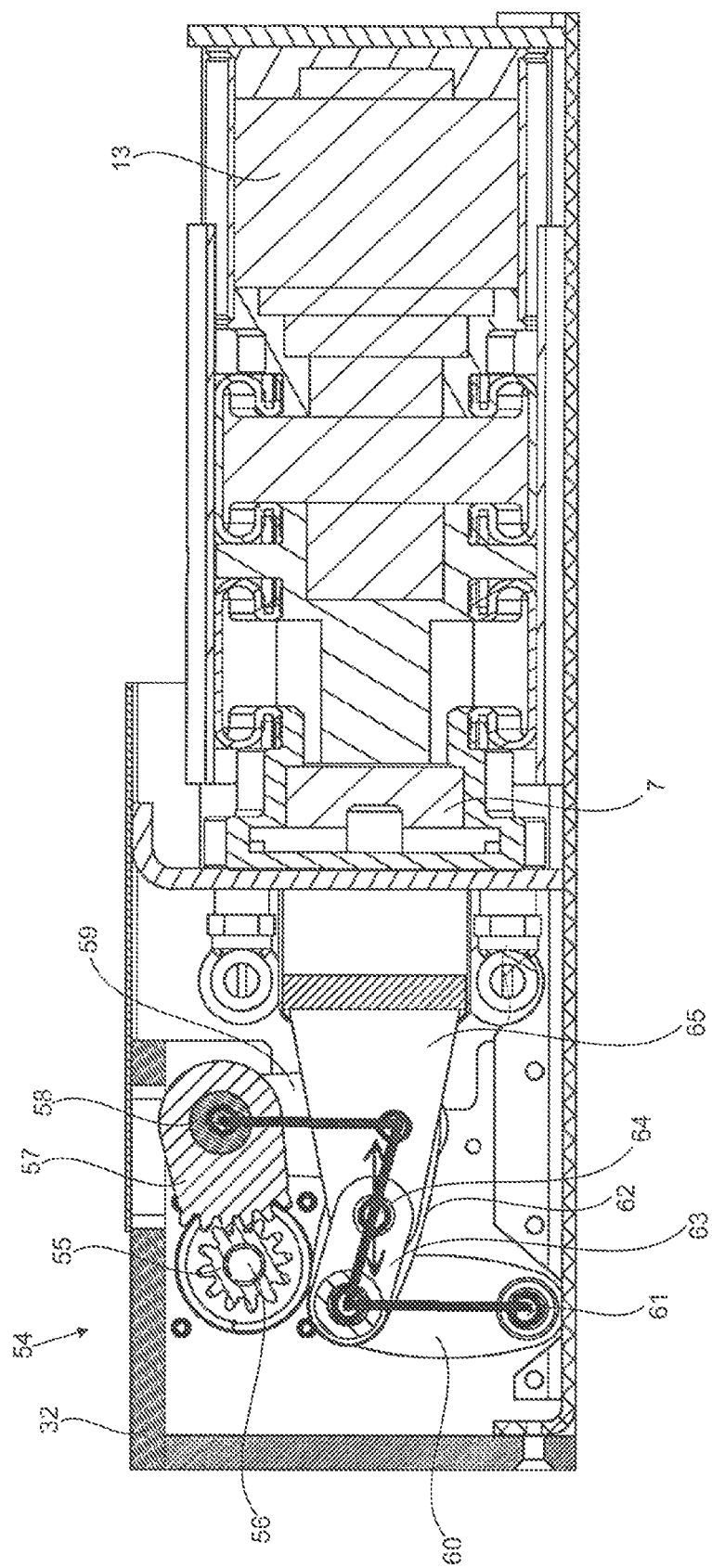
FIG. 7C shows the additional volume module according to FIG. 7B with schematic additions.

In FIGS. 7A, 7B and 7C, an alternative control unit 10 is provided which, in contrast to the embodiment according to FIGS. 4, 5 and 6, differs in the type of drive or control unit 10. The embodiments regarding the working volume 7, the support volume 13 and the design thereof are analogous to the embodiment according to FIGS. 4, 5 and 6.

Instead of the spindle 29 and the nut 30, a Watt drive 54 is now described.

On the motor 53, which is preferably an electric motor, a gearwheel 55 is arranged, which can be rotated about a third axis of rotation 56. The gearwheel 55 is in contact with a gearwheel element 57 which is rotatably mounted about a fourth axis of rotation 58. A first lever 59 is rigidly connected to the gearwheel element 57, so that the first lever 59 can also be rotated about the fourth axis of rotation 58.

In addition, a second lever 60 is provided, which is rotatably connected to the housing about a fifth axis of rotation 61. Furthermore, a third lever 62 is provided, which is rotatably connected to the first lever 59 and the second lever 60.

A fourth lever 63 is also provided, which is arranged parallel to the third lever 63 and defines a connection point 64 which corresponds to the point which can be moved almost in a straight line by means of the Watt drive. At the connection point 64, a connecting element 65 is arranged, which can move almost in a straight line due to the Watt drive. The volume of the working volume 7 is changed by the movement of the connecting element 65.

In FIG. 7C, the functional principle of the Watt drive 54 is shown again schematically.

Figure 8A:
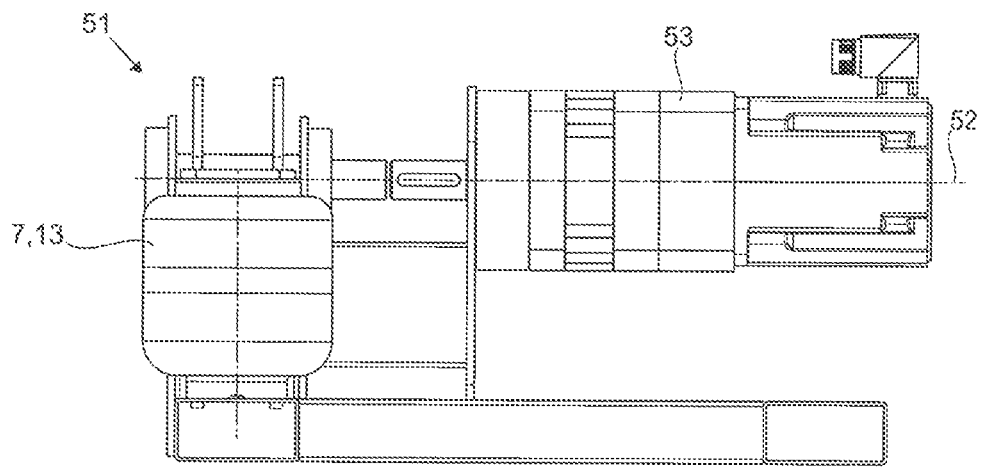
FIG. 8A is a side view of the additional volume module according to a third embodiment.
Figure 8B:
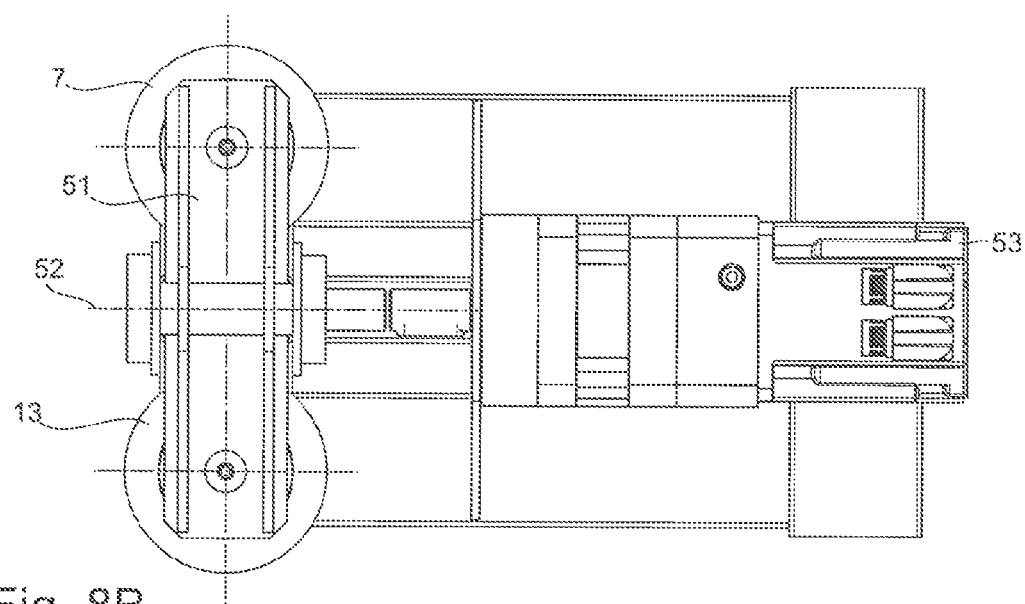
FIG. 8B is a top view of the additional volume module according to FIG. 8A.
Figure 8C:
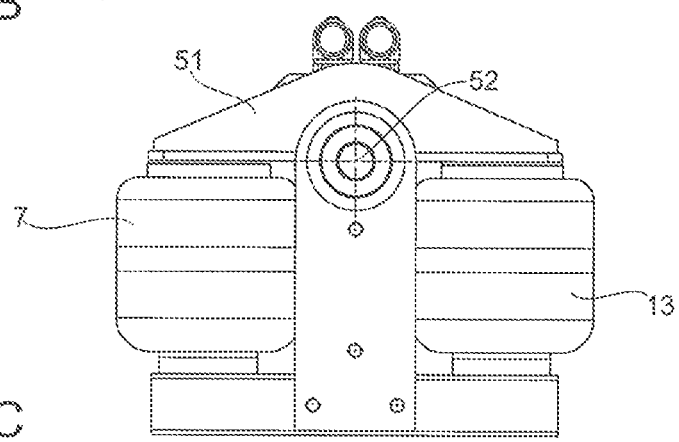
FIG. 8C is a front view of the additional volume module according to FIG. 8A.

FIGS. 8A, 8B and 8C show an alternative control unit 10 for changing the volume 9 of the working volume 7. In this case, FIG. 8A shows the control unit 10 in a side view, FIG. 8B in a top view and FIG. 8C in a front view.

The control unit 10 preferably comprises a motor, in particular an electric motor having a rocker-like deformation element 51, which deforms the working volume 7 and the support volume 13 depending on the direction of rotation of the motor. A deformation occurs in particular because the deformation element 51 presses on the respective volume, thereby changing the shape and accordingly changing the volume in the working volume 7 and accordingly changing the pressure in the working volume 7, so that the pressure in the air spring 5 can be changed accordingly.

In this case, the control unit comprises a rocker-like deformation element 51 which is connected to a motor 53 so that it can be rotated about a second axis of rotation 52. Depending on the direction of rotation of the motor 53, the working volume 7 and the support volume 13 are deformed. It is also conceivable that no support volume 13 is provided.

All features disclosed in the application documents are claimed as being substantial to the invention, provided that they are, individually or in combination, novel over the prior art.

LIST OF REFERENCE SIGNS 1 vehicle seat
2 vehicle seat upper part
3 vehicle seat lower part
4 device
5 air spring
6 distance
7 working volume
8 additional volume module
9 volume of the working volume
10 control unit
11 detection unit
12 compressor unit
13 support volume
14 valve
18 linear drive
19 spindle-nut combination
21 scissor frame
22 first fluid connection
23 second fluid connection
24 third fluid connection
25 first sensor
26 second sensor
27 third sensor
28 motor
29 spindle 30 nut
31 connection
32 housing
32 first end of the housing
32 second end of the housing
33 first cover
34 second cover
35 first holding element
36 drive
37 stator
38 rotor
39 axis of rotation
40 first end of the spindle
41 second end of the spindle
42 ball bearing
43 second holding element
44 piston-like element
45 enclosure
46 separating element
47 third holding element
48 first bellows element
49 second bellows element
50 limiting means
51 rocker-like deformation element
52 second axis of rotation
53 (electric) motor
54 Watt drive
55 gearwheel
56 third axis of rotation
57 gearwheel element
58 fourth axis of rotation
59 first lever
60 second lever
61 fifth axis of rotation
62 third lever
63 fourth lever
64 connection point
65 connecting element
M mass
Z0 not deflected
Z1 deflected downwards
Z2 deflected upwards

What is claimed is:

1. A vehicle seat comprising a vehicle seat upper part on which a mass can be arranged, a vehicle seat lower part, and a device for level regulation and level stabilization of the vehicle seat upper part, the device having an air spring that spring loads a movement of the vehicle seat lower part and of the vehicle seat upper part relative to one another, wherein
the vehicle seat lower part and the vehicle seat upper part are arranged in a non-deflected state at a predeterminable first distance from one another and the air spring is fluidically connected to a volume of a working volume of an additional volume module via a first fluid connection,
wherein
the vehicle seat has a control unit, wherein the control unit decreases the volume of the working volume in the event of an increase in the first distance due to the relative movement such that a pressure in the air spring is adapted such that a second distance between the vehicle seat upper part and a reference surface that does not change in position is substantially unchanged, and to increase the volume of the working volume in the event of a decrease in the first distance due to the relative movement such that the pressure in the air spring is adapted such that the second distance between the vehicle seat upper part and the reference surface that does not change in position is substantially unchanged.

2. The vehicle seat according to claim 1, wherein the control unit is arranged on or in the additional volume module.

3. The vehicle seat according to either claim 1, wherein the device has a detection unit which is designed and provided to detect the change in the distance, the control unit being connected for signalling to the detection unit and changing the volume of the working volume depending on the detected change in the distance.

4. The vehicle seat according to claim 1, wherein the device has a compressor unit which is designed and provided to fill the air spring and the working volume with a fluid so that a specific pressure prevails within the air spring, whereby the first distance is predetermined.

5. The vehicle seat according to claim 4, wherein the additional volume module further has a support volume which is connected to the working volume for force support during a change in volume of the working volume by means of the control unit.

6. The vehicle seat according to claim 5, wherein the support volume is fluidically connected to the working volume during the filling of the air spring with fluid by the compressor unit by means of an open valve and otherwise are fluidically disconnected from the working volume.

7. The vehicle seat according to claim 3, wherein the detection unit has a first sensor arranged on the vehicle seat upper part, a second sensor arranged on the vehicle seat lower part, and a third sensor for determining a position of the vehicle seat upper part relative to the vehicle seat lower part.

8. The vehicle seat according to claim 1, wherein the device has a linear drive which is provided and designed to change the volume of the working volume.

9. The vehicle seat according to claim 8, wherein the linear drive is at least one selected from the group comprising a spindle-nut combination, a toothed rack, a conversion gear, a direct drive, a link guide and a deformation apparatus.

10. The vehicle seat according to claim 1, wherein the working volume is designed as an air spring having a rolling bellows, as a bellows spring, as an air cylinder or as an air motor.

11. The vehicle seat according to claim 5, wherein the support volume is designed as an air spring having a rolling bellows, as a bellows spring, as an air cylinder or as an air motor.

12. A method for level regulation and level stabilization of a vehicle seat upper part of a vehicle seat, wherein the vehicle seat has an upper vehicle seat upper part which can be displaced by an air spring relative to a vehicle seat lower part, wherein the air spring is fluidically connected to a working volume of an additional volume module and a pressure in the air spring is changed by the working volume, comprising the method steps:
a) occupying the vehicle seat upper part with a mass;
b) setting a first distance between the vehicle seat lower part and the vehicle seat upper part by filling the working volume and the air spring by a compressor with a required amount of fluid and deactivating the compressor after the filling process;
c) detecting a change in the first distance due to a movement of the vehicle seat lower part and the vehicle seat upper part relative to one another;

d) changing the pressure in the air spring by changing a volume of the working volume, wherein in the event of an increase in the first distance due to the relative movement, the volume of the working volume is decreased, and in the event of a decrease in the first distance due to the relative movement, the volume of the working volume is increased, so that the pressure in the air spring is adapted such that a second distance between the vehicle seat upper part and a reference surface that does not change in position is substantially unchanged.

* * * * *